Sept. 13, 1927.
J. B. WENZEL
PACKING RING
Filed Aug. 15, 1923
1,642,524
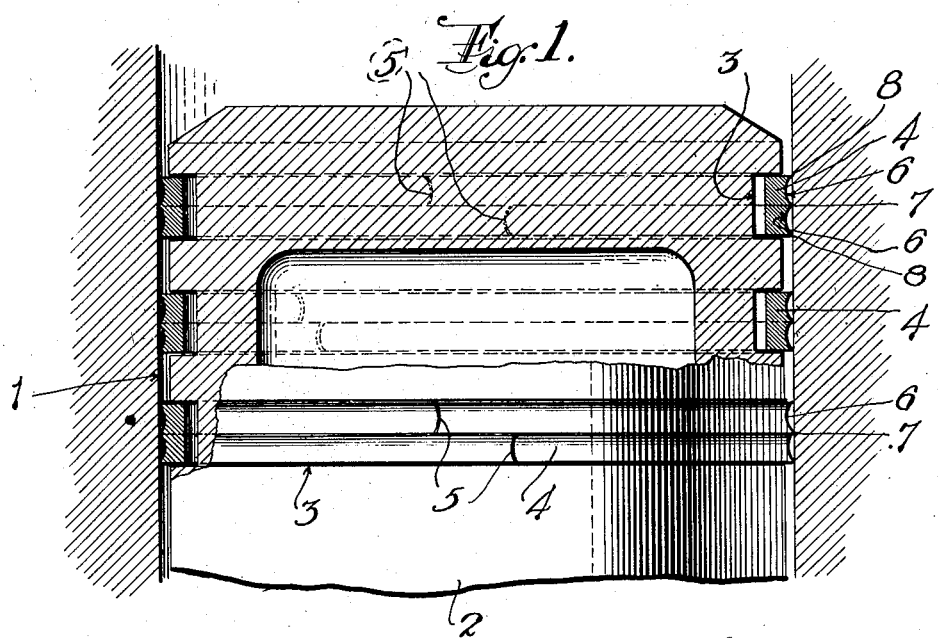
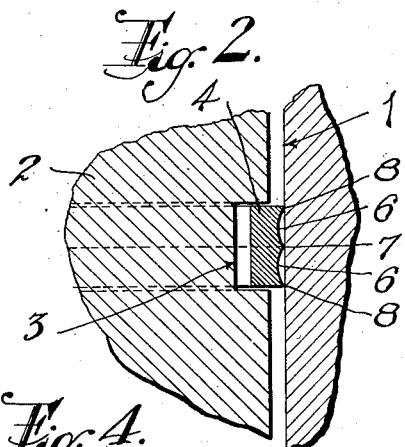
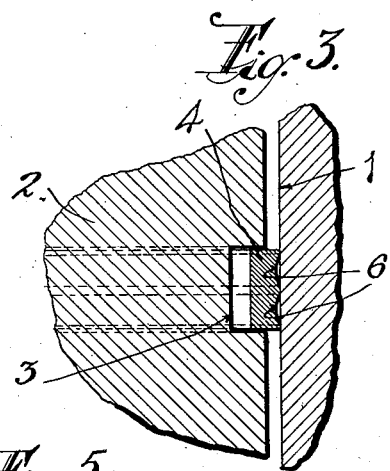
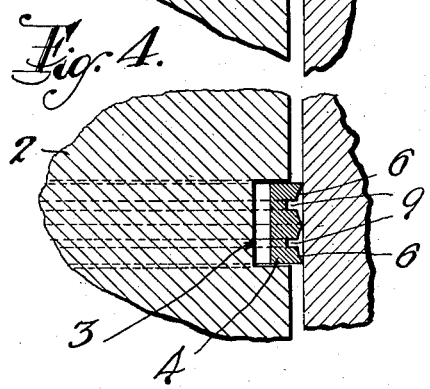
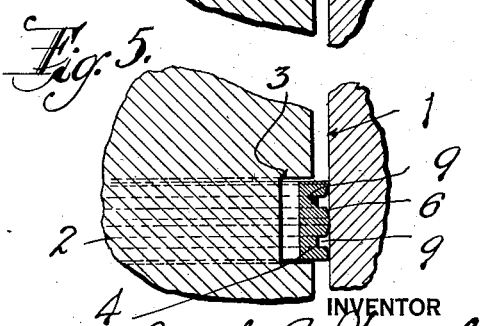
INVENTOR
Jacob B. Wenzel,
BY
Everett W. Rook,
ATTORNEYS.

Patented Sept. 13, 1927.

1,642,524

UNITED STATES PATENT OFFICE.

JACOB B. WENZEL, OF BLOOM, COLORADO, ASSIGNOR TO ALBERT W. WENZEL, OF NEWARK, NEW JERSEY.

PACKING RING.

Application filed August 15, 1923. Serial No. 657,541.

This invention relates to that class of packing rings commonly known as piston rings and used generally in internal combustion engines. More particularly the invention relates to piston rings of the type described in my co-pending application Serial No. 572.251 and United States Patent No. 1,242,142 of October 9, 1917, wherein the ring is transversely concaved to form comparatively sharp edges at its sides for enabling the ring to quickly "wear in" or seat itself against the cylinder walls.

Piston rings of this construction have been found objectionable in practice for the reason that it is extremely difficult, if not impossible, to so form the concave in the face of the ring that the edges are not irregular and wavy instead of true circles. In other words the concavity, instead of being a groove all circumferential points of which are in planes parallel to the plane of the ring, is serpentine in form with the edges running off the ring at different places so that the edges of the ring in plan view are corrugated. As the result of this the ring does not form a gas tight seal with the cylinder walls.

The primary object of the present invention is to provide a piston ring having a plurality of circumferential grooves in its wearing face, said grooves being closely disposed transversely of the said face of the ring to form comparatively sharp ridges or ribs between the grooves and at the edges of the ring, whereby the ridges or ribs intermediate the edges of the ring may waver transversely without running off the edges of the ring, thereby ensuring a gas tight seal of at least the said intermediate ribs or ridges with the cylinder wall. Preferably all of said grooves would be formed simultaneously.

Further objects are to provide oil grooves at the base of each of said circumferential grooves to carry oil for lubrication while said sharp edges and ribs are "wearing in" or seating, and to obtain other results and advantages as may be brought out by the following description.

Referring to the accompanying drawings, in which like numerals of reference indicate the same parts throughout the several views, Figure 1 is a view of a piston partially in side elevation and partially in section, having a plurality of piston rings embodying my invention mounted thereon, portions of the piston being broken away;

Figure 2 is an enlarged transverse vertical sectional view through one side of the piston and one of the rings before the ring has started to "wear in";

Figure 3 is a view similar to Fig. 2, showing the ring partially worn in;

Figure 4 is a view similar to Fig. 2, showing a modified construction of the ring in which an oil groove is provided in each of the circumferential grooves, and Figure 5 is a view similar to Fig. 3, showing the ring partially worn in.

In the specific embodiment of the invention shown in Figures 1–3 of the drawings, the reference character 1 designates the inner wall of a cylinder within which a piston 2 is adapted to reciprocate. The piston is provided with the usual circumferential piston ring grooves 3 which may be of any desired number and arranged in any suitable manner on the piston.

A piston ring 4 is arranged in each of the grooves 3, and said ring is preferably formed of metal and split in the usual manner as at 5. The ring may be of any desired cross-section, with the exception of the outer peripheral face, but in the present instance is shown as substantially rectangular.

The outer peripheral surface of the ring or the surface which bears upon the cylinder walls is provided with a plurality of circumferential grooves 6 which are closely disposed transversely of the said wearing surface of the ring to form a rib or ridge 7 intermediate the edges of the ring, the outer edges of the outermost grooves forming with the sides of the ring comparatively sharp edges 8 arranged in substantially the same plane transversely of the ring as the rib 7. The grooves 6 are preferably shallow and any suitable number of grooves may be utilized, but in the present instance two grooves are shown.

In operation, the rings are applied to the piston ring grooves 3 in the usual manner, and when the piston is mounted within the cylinder 1, the ribs 7 and edges 8 engage the walls of the cylinder, as shown in Figures 1 and 2. As the piston reciprocates during operation of the engine, the ribs 7 and edges 8 are quickly worn down as shown in Figure 3, whereby the ring quickly wears into sealing relation to the cylinder wall with the edges 8 and ribs 7 wearing away more or less at different circumferential points, as is necessary to make the entire ring fit. It will be observed that even though the grooves 6 waver transversely of the wearing surface of the ring when the grooves are being formed, the intermediate ribs 7 cannot run over the edges of the ring, so that in plan view the ribs 7 are always truly circular and will snugly engage the walls of the cylinder at all circumferential points.

It is also a feature of my invention to provide means within the grooves 6 for carrying oil to lubricate the cylinder walls and ribs 7 and edges 8 while the latter are wearing in to prevent scoring of the cylinder walls. For this purpose, each of the grooves 6 may be provided at its base with a circumferential groove 9 which is relatively deep, said grooves being adapted to contain oil while the rings are wearing in. Also said lubricating grooves 9 will retain the oil after the grooves 6 have been worn out and the rings are completely and accurately worn into engagement with the cylinder walls. It will thus be seen that a piston ring embodying my invention will quickly wear in and will produce a gas tight seal with the cylinder walls from the first moment of operation of the piston. It will also be observed that the construction shown in Figures 4 and 5 is substantially one groove within another whereby the quick wearing in of the ring is obtained and at the same time lubrication is ensured during the period while the ring is being worn in.

While I have shown the grooves 6 of arcuate shape, and the oil grooves 9 of substantially rectangular shape, it will be understood that it is within the scope of the invention to vary the size and shape of these grooves as may be desired. Also the number of the grooves 6 and 9 may be varied without departing from the spirit or scope of the invention. Therefore, I do not wish to be understood as limiting myself except as required by the following claim when construed in the light of the prior art.

Having thus described the invention, what I claim is:

A piston ring which is peripherally dished to produce outwardly sloping surfaces terminating in sharp outer edges at the top and bottom of the ring, there being a central rib standing up from the base of the dish and having a bearing surface in axial alinement with said edges.

JACOB B. WENZEL.